United States Patent
Lee et al.

(10) Patent No.: US 9,428,256 B2
(45) Date of Patent: Aug. 30, 2016

(54) SHIP ALTERNATIVELY RUNNING FUEL GAS MAIN DRIVE ENGINE AND FUEL GAS GENERATOR ENGINE

(75) Inventors: Jin Kwang Lee, Geoje-si (KR); Dong Kyu Choi, Geoje-si (KR); Jung Han Lee, Geoje-si (KR)

(73) Assignee: Daewoo Shipbuilding & Marine Engineering Co., Ltd., Seoul (KR)

( * ) Notice: Subject to any disclaimer, the term of this patent is extended or adjusted under 35 U.S.C. 154(b) by 517 days.

(21) Appl. No.: 13/502,365

(22) PCT Filed: Oct. 18, 2010

(86) PCT No.: PCT/KR2010/007122
§ 371 (c)(1),
(2), (4) Date: Jun. 5, 2012

(87) PCT Pub. No.: WO2011/046412
PCT Pub. Date: Apr. 21, 2011

(65) Prior Publication Data
US 2012/0252285 A1    Oct. 4, 2012

(30) Foreign Application Priority Data
Oct. 16, 2009 (KR) .................. 10-2009-0098991

(51) Int. Cl.
*B63H 21/20* (2006.01)
*B63H 21/14* (2006.01)
*B63H 21/17* (2006.01)

(52) U.S. Cl.
CPC ............ *B63H 21/20* (2013.01); *B63H 21/14* (2013.01); *B63H 21/17* (2013.01); *B63H 2021/205* (2013.01); *Y02T 10/36* (2013.01); *Y02T 70/5218* (2013.01); *Y02T 70/5236* (2013.01)

(58) Field of Classification Search
CPC ............................... B63H 21/20; B63H 21/14
USPC ..................................... 440/3, 1, 6
See application file for complete search history.

(56) References Cited

U.S. PATENT DOCUMENTS 5,711,270 A    1/1998  Pedersen
6,978,617 B2 *  12/2005  Goldmeer ............. F01K 25/005
                                                    429/418

(Continued)

FOREIGN PATENT DOCUMENTS

JP    63-302169 A    12/1988
JP    05-139381 A    6/1993

(Continued)

OTHER PUBLICATIONS

Japanese Office Action dated Oct. 1, 2013 of corresponding Japanese Patent Application 2012-535117—3 pages.

(Continued)

*Primary Examiner* — Lars A Olson
*Assistant Examiner* — Jovon Hayes
(74) *Attorney, Agent, or Firm* — Knobbe Martens Olson & Bear LLP

(57) ABSTRACT

A ship includes: a high-pressure injection engine using fuel gas as fuel to obtain a propulsion power of the ship; a generator engine using fuel gas as fuel to generate electricity; a motor generating a power by using the electricity generated from the generator engine; a propulsion propelling the ship; a main clutch connecting the high-pressure injection engine to the propulsion; an auxiliary clutch connecting the gear box to the propulsion; and a gear box disposed in a front side of the propulsion and power-connected to the main clutch and the auxiliary clutch. The high-pressure injection engine and the motor are selectively power-connected to the propulsion to obtain the propulsion power of the ship.

11 Claims, 4 Drawing Sheets

(56) References Cited

U.S. PATENT DOCUMENTS

| | | | |
|---|---|---|---|
| 7,308,889 B2* | 12/2007 | Post | F02M 55/005 123/27 GE |
| 8,062,081 B2* | 11/2011 | Barrett | B63H 21/20 440/1 |
| 2008/0190352 A1 | 8/2008 | Lee et al. | |
| 2009/0266086 A1 | 10/2009 | Lee et al. | |
| 2012/0108116 A1* | 5/2012 | Takahira | B63H 21/17 440/6 |
| 2012/0108117 A1* | 5/2012 | Kwon | B63B 25/14 440/6 |
| 2012/0240874 A1 | 9/2012 | Yoo et al. | |
| 2012/0252285 A1* | 10/2012 | Lee | B63H 21/20 440/3 |

FOREIGN PATENT DOCUMENTS

| | | |
|---|---|---|
| JP | 2005-219737 A | 8/2005 |
| JP | 2008-126829 A | 6/2008 |
| KR | 10-0742677 B1 | 10/2003 |
| KR | 10-0396471 B1 | 11/2003 |
| KR | 10-0804965 B1 | 2/2008 |
| KR | 10-2008-022903 A | 3/2008 |
| KR | 10-0922007 A | 10/2009 |

OTHER PUBLICATIONS

International Search Report dated Jun. 17, 2011 of PCT/KR2010/006789 which is the parent application—6 pages.

* cited by examiner

SHIP ALTERNATIVELY RUNNING FUEL GAS MAIN DRIVE ENGINE AND FUEL GAS GENERATOR ENGINE

TECHNICAL FIELD

The present invention relates to a ship for selectively driving a fuel gas main propulsion engine and a fuel gas generator engine, and more particularly, a ship for selectively driving a fuel gas main propulsion engine and a fuel gas generator engine, which obtains a propulsion power of the ship from the fuel gas generator engine at a low power, thereby saving a fuel cost and solving an environmental problem.

BACKGROUND ART

Until now, a propulsion engine which uses oil as fuel has been generally used in a merchant ship such as a container carrier or a passenger ship. Due to the recent oil price increase, however, more and more ships are employing a propulsion engine which uses liquefied fuel gas, for example, liquefied natural gas (LNG), which is much cheaper than oil. Furthermore, since the price of LNG in the summer season is 50% lower than in the winter season, LNG may be purchased and stored in the summer season. Therefore, LNG has an advantage in terms of price.

A ship engine capable of obtaining a propulsion or generation power by using LNG as fuel may include a ME-GI engine or a dual fuel(DF) engine. The ME-GI engine is referred to as a gas injection engine which compresses LNG and then injects and burns the compressed LNG. In particular, the ME-GI engine is referred to a high-pressure gas injection engine which compresses LNG, or LPG at a high pressure of 150-600 bar and then injects and burns the compressed LNG, or liquid LPG.

Such a gas injection engine has an operation structure which uses both oil (heavy fuel oil (HFO) or marine diesel oil (MDO)) and fuel gas (LNG, or LPG), and obtains a power by supplying oil to the engine at a low power (for example, less than 30% of the maximum power) and obtains a power by using both oil and fuel gas when the power level is equal to or more than 30% of the maximum power. The operation method of the gas injection engine has been disclosed in Korean Patent No. 0396471.

Such a gas injection engine has a problem in that fuel gas which is a cheap and clean energy source cannot be used at a low power. In general, a ship sails at a low power around a harbor. When the ship uses oil as an energy source at a low power, large amounts of environmental pollutant materials such as $SO_x$ and $NO_x$ are discharged. Recently, more and more countries tend to set up storing regulations against the discharge of environmental pollutant materials around a harbor.

Therefore, there is a demand for a new propulsion system which is capable of using fuel gas, which is cheap and produces small amounts of environmental pollutant materials, as fuel even at a low power.

DISCLOSURE

Technical Problem

An embodiment of the present invention is directed to a ship having a propulsion system capable of using fuel gas as fuel even when the ship is operated at a low power.

Advantageous Effects

According to the embodiment of the present invention, the ship includes the fuel gas main propulsion engine and the fuel gas generator engine, and obtains a propulsion power by using the electricity generated by the gas fuel generator engine, at a low power level. Therefore, it is possible to save a fuel cost and to solve an environmental problem.

Furthermore, a separate facility for treating BOG which is produced when fuel gas is gasified may not be required, and the BOG may be used as fuel gas in the main propulsion engine 10 or the generator engine 20. Therefore, the precious energy source may be reused without being discarded.

DESCRIPTION OF THE SYMBOLS IN MAIN PORTIONS OF THE DRAWINGS

Figure 1:
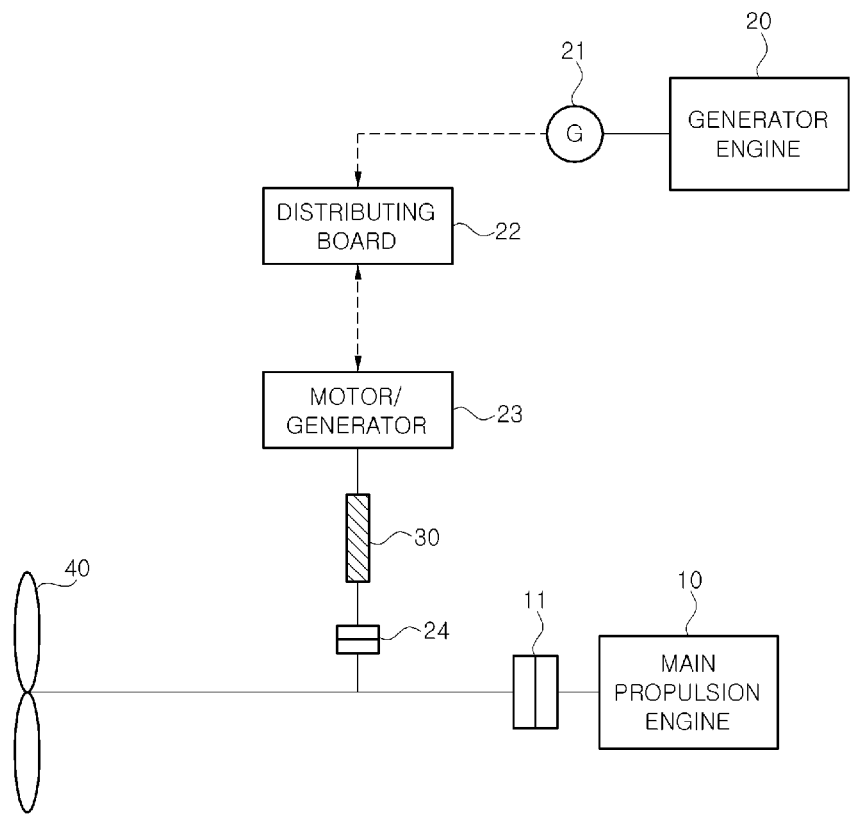
FIG. 1 is a diagram schematically illustrating a ship having a main propulsion engine and a generator engine according to an embodiment of the present invention.

10: main propulsion engine
11: main clutch
20: generator engine
21: generator
22: distributing board
23: motor/generator
24: auxiliary clutch
30: gear box
40: propulsion

BEST MODE

According to an aspect of the present invention, a ship includes: a high-pressure injection engine using fuel gas as fuel to obtain a propulsion power of the ship; a generator engine using fuel gas as fuel to generate electricity; a motor generating a power by using the electricity generated from the generator engine; a propulsion propelling the ship; a main clutch power-connecting the high-pressure injection engine to the propulsion; an auxiliary clutch power-connecting a gear box to the propulsion. The high-pressure injection engine and the gear box are selectively power-connected to the propulsion to obtain the propulsion power of the ship.

When the ship is operated at less than a predetermined power, the high-pressure injection engine may be stopped, the power connection between the main clutch and the propulsion may be cut off, the auxiliary clutch may be power-connected to the propulsion through the gear box, and the electricity generated by the generator engine may be transmitted to the propulsion through the motor, the gear box, and auxiliary clutch to obtain the propulsion power of the ship.

The ship may further include a liquefied fuel gas storage tank storing liquefied fuel gas. Boil-off gas (BOG), which is produced when the liquefied fuel gas stored in the liquefied fuel gas storage tank is evaporated, may be used as fuel gas by the high-pressure injection engine or the generator engine.

The predetermined power may be equal to or less than 40% of the maximum power of the high-pressure injection engine.

The pressure of fuel gas supplied to the high-pressure injection engine may range from 150 to 600 bar.

The generator engine may include a dual fuel(DF) engine, a gas engine, or a gas turbine.

The motor may include a motor/generator, and a part of the power transmitted through the high-pressure injection engine may be transmitted to the motor/generator through the gear box and the auxiliary clutch in order to generate electricity.

The electricity generated by the motor/generator may be supplied to a variety of electricity consumers of the ship through a distributing board.

MODE FOR INVENTION

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
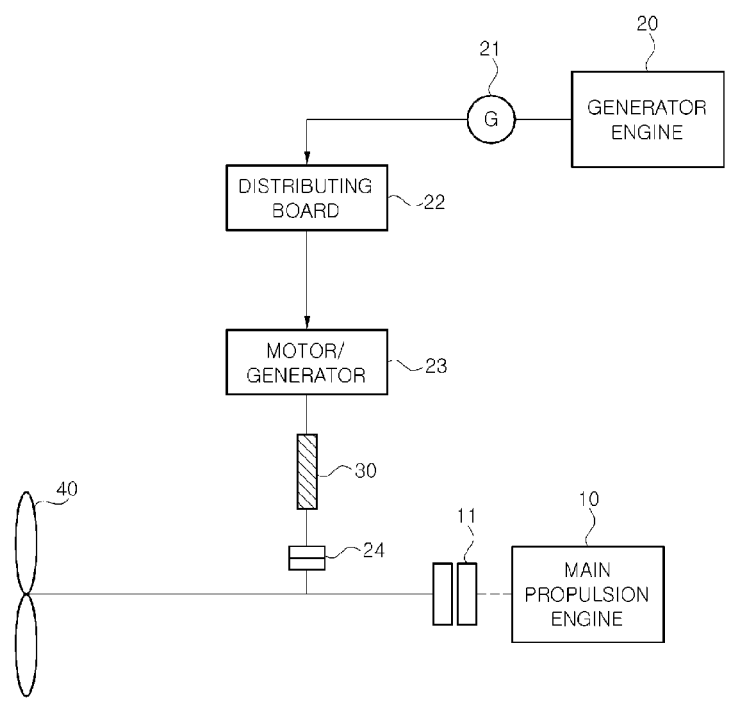
FIG. 2 is a diagram showing a state in which the main propulsion engine is not connected to a propulsion, but the propulsion is driven by the generator engine.

FIG. 1 is a diagram schematically illustrating a ship having a main propulsion engine and a generator engine according to an embodiment of the present invention. FIG. 2 is a diagram showing a state in which the main propulsion engine is not connected to a propulsion, but the propulsion is driven by the generator engine.

The ship according to the embodiment of the present invention includes a main propulsion engine 10, a generator engine 20, a propulsion 40 and so on.

The main propulsion engine 10 is a high-pressure gas injection engine which uses fuel gas to obtain a propulsion power of the ship. The pressure of the fuel gas supplied to the main propulsion engine 10 ranges from 150 to 600 bar (gauge pressure). The main propulsion engine (or the high-pressure injection engine) 10 may include an ME-GI engine, for example. The maximum power of the ME-GI engine may approach about 87 MW.

Such a main propulsion engine uses oil as fuel at less than a predetermined power, for example, at less than 40% of the maximum power thereof, or desirably, less than 30% of the maximum power, and uses both oil and fuel gas at more than the predetermined power. The main propulsion engine uses bunker C oil (HFO) or MDO.

The generator engine 20 is an engine which uses fuel gas(LNG) to generate electricity. The generator engine 20 may include a DF engine or gas turbine, for example. The pressure of fuel gas supplied to the DF engine is equal to or less than 10 bar, and the pressure of fuel gas supplied to the gas turbine ranges from 15 to 30 bar. The maximum power of the generator engine may approach 4 MW, and four generator engines may be installed at the same time. Such a generator engine may use bunker C oil or MDO as fuel.

The propulsion 40 is power-connected to the main propulsion engine 10 through a main clutch 11 or power-connected to the generator engine 20 through a auxiliary clutch 24.

Between the main propulsion engine 10 and the propulsion 40, the main clutch 11 is positioned to connect a power from the main propulsion engine 10 to the propulsion 40 or cut off the power connection.

In the rear side of the generator engine 20, a generator 21 is positioned to convert a power generated by the generator engine 20 into electricity. The electricity generated by the generator 21 may be supplied to a variety of electricity consumers of the ship through a distributing board 22.

In the rear side of the distributing board 22, a motor/generator (or motor) 23 is positioned. In the rear side of the motor/generator 23, a gear box 30 is positioned.

The auxiliary clutch 24 serves to connect a power between the gear box 30 and the propulsion 40 or cut off the power connection.

The power from the main propulsion engine 10 and the power from the generator engine 20 may be selectively transmitted to the propulsion 40 by the main clutch 11 and the auxiliary clutch 24.

For example, the main clutch 11 is power-connected at normal times such that the ship is driven by the main propulsion engine 10. During an emergency in which a trouble or the like occurs, the connection of the main clutch 11 is cut off, and the auxiliary clutch 24 is connected to transmit a power to the propulsion 40 through the motor/generator 23 by using the electricity generated by the generator engine 20.

As the ship is selectively driven by the main propulsion engine 10 and the generator engine 20, it is possible to actively deal with an emergency in which the main propulsion engine 10 is out of order.

Meanwhile, when the ship is operated at a low power level, for example, less than 30% of the maximum power of the main propulsion engine 10, the ship is operated only by oil in consideration of the engine's property. In this case, the ship cannot use fuel gas as fuel. When the ship is operated at a low power, it may correspond to a case in which the ship sails around a harbor. When the ship uses bunker C oil or MDO as fuel, large amounts of environmental pollutant materials such as $SO_x$ and $NO_x$ are discharged. Recently, more and more countries tend to set up regulations against the discharge of environmental pollutant materials around a harbor. In order to deal with such environmental regulations, when oil from which small amounts of pollutant materials are discharged is used to drive the engine of the ship, a fuel cost for the operation of the ship inevitably increases.

In this embodiment of the present invention, the ship may be selectively driven by the main propulsion engine 10 and the generator engine 20. Therefore, when the ship is operated at a low power, the main propulsion engine 10 is stopped, and the electricity generated by the generator engine 20 is transmitted to the propulsion 40 through the motor, that is, the motor/generator 23, in order to obtain a propulsion power of the ship.

Referring to FIG. 2, the connection of the main clutch 11 is cut off so that a power is not transmitted between the main propulsion engine 10 and the propulsion 40, and only the auxiliary clutch 24 is connected to rotate the motor/generator 23 by using the electricity supplied by the distributing board 22 such that the power is transmitted to the propulsion 40 through the gear box 30.

According to the above-described embodiment of the present invention, the ship may be selectively driven by the main propulsion engine 10 and the generator engine 20. When the ship is operated at a low power state, the main propulsion engine 10 which needs to use oil is stopped, and the electricity generated by the generator engine 20 using LNG which is a cheap and clean energy source may be used to drive the ship. Therefore, when the ship is operated at a low power state, a fuel cost required for driving the ship is considerably reduced, and it is possible to deal with the regulations against the discharge of environmental pollutant materials.

In the embodiment of the present invention, boil-off gas (BOG) produced when LNG is gasified may be used as fuel gas in the main propulsion engine 10 or the generator engine 20.

The liquefaction temperature of LNG is as ultra low as 163 degrees below zero at a normal pressure. Therefore, even when the temperature of LNG is slightly higher than 163 degrees below zero at a normal pressure, LNG is evaporated. Although an LNG storage tank (or a liquefied fuel gas tank) is thermally insulated, BOG is continuously produced in the tank because external heat is continuously transmitted to LNG stored in the LNG storage tank. When the BOG is continuously produced, the pressure of the LNG storage tank excessively increases. Therefore, the produced BOG is discharged to the outside of the tank and then treated by a BOG treatment facility. Such a BOG treatment facility may include a vent for discharging the BOG to the air, a gas combustion unit or a flare for burning the BOG, and a reliquefaction unit.

The amount of BOG produced in the LNG storage tank may exceed an amount to be used as fuel gas in the main propulsion engine 10. Furthermore, when the ship is operated at a low power, the ship cannot use LNG as fuel. Therefore, it is very important to treat BOG in a ship which uses LNG as fuel. Most ships discharge the BOG to the air or burn the BOG away.

The ship according to the embodiment of the present invention does not include a separate facility for treating BOG, but the BOG may be used as fuel gas in the main propulsion engine 10. When an amount of BOG which exceeds the amount to be used as fuel gas in the main propulsion engine 10 is produced, the BOG may be used as fuel gas in the generator engine 20. Therefore, since the precious energy source may be reused without being discarded, a fuel cost may decrease. Furthermore, since a separate facility for treating BOG is not required, a ship building cost may decrease.

Figure 3:
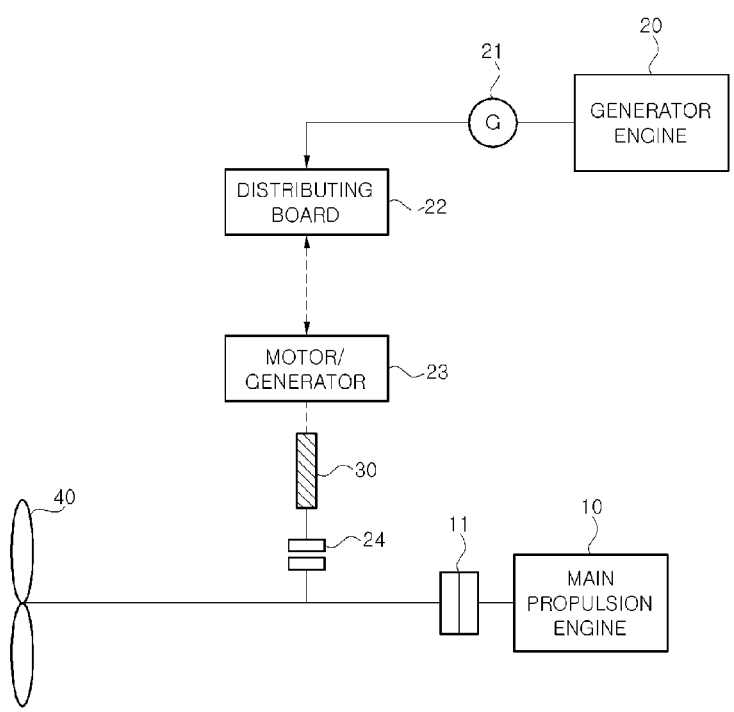
FIG. 3 is a diagram showing a case in which only a main clutch is connected and the connection of an auxiliary clutch is cut off.

FIG. 3 is a diagram showing a case in which only the main clutch is connected and the connection of the auxiliary clutch is cut off.

When the ship is normally operated, the power from the main propulsion engine 10 is transmitted to the propulsion 40 through the main clutch 11 to drive the ship. LNG, or LPG is used as the fuel gas for driving the main propulsion engine 10, and BOG may be additionally supplied to the main propulsion engine 10. Furthermore, the BOG may also be supplied to the generator engine 20 and used for the generator 21 to generate electricity.

Figure 4:
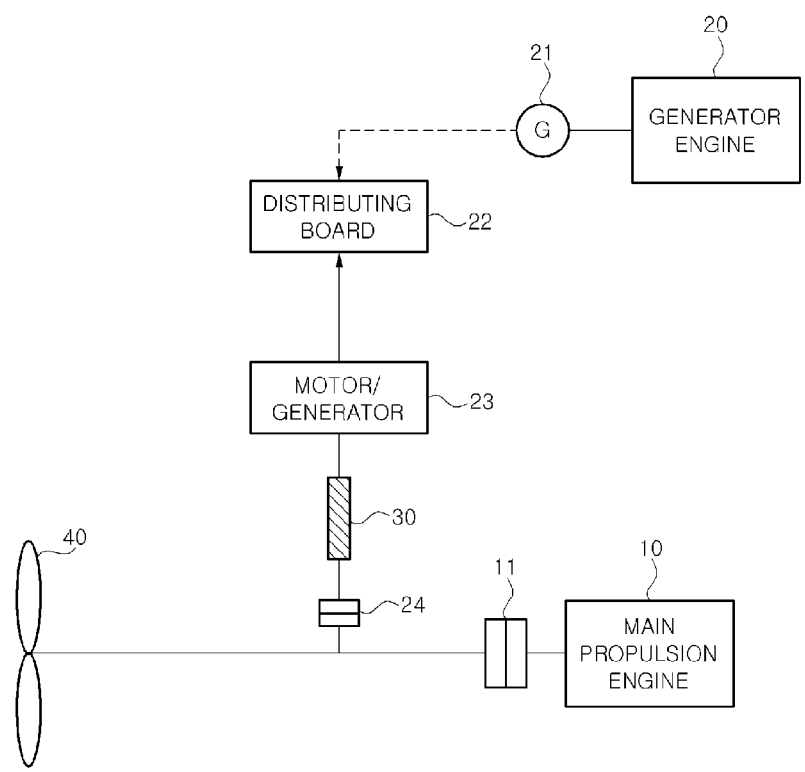
FIG. 4 is a diagram showing a case in which both of the main clutch and the auxiliary clutch are connected.

FIG. 4 is a diagram showing a case in which both of the main clutch and the auxiliary clutch are connected.

When the ship is normally operated, the power from the main propulsion engine 10 is transmitted to the propulsion 40 through the main clutch 11 to drive the ship. LNG or LPG is used as the fuel gas for driving the main propulsion engine 10, and BOG may be additionally supplied to the main propulsion engine 10. An amount of BOG which exceeds the amount required to drive the propulsion 40 may be transmitted through the gear box 30 connected to the auxiliary clutch 24 and then used for the motor/generator 23 to generate electricity. The electricity generated by the motor/generator 23 may be collected by the distributing board 22 and then supplied to a variety of electricity consumers of the ship.

According to the embodiment of the present invention, the ship includes the fuel gas main propulsion engine and the fuel gas generator engine, and obtains a propulsion power by using the electricity generated by the fuel gas generator engine, at a low power level. Therefore, it is possible to save a fuel cost and to solve an environmental problem. Furthermore, a separate facility for treating BOG which is produced when liquefied fuel gas is gasified may not be required, and the BOG may be used as fuel gas in the main propulsion engine 10. Furthermore, when an amount of BOG exceeding the amount to be used as fuel gas in the main propulsion engine 10 is produced, the BOG may be used as fuel gas in the generator engine 20. Therefore, the precious energy source may be reused without being discarded.

While the present invention has been described with respect to the specific embodiments, it will be apparent to those skilled in the art that various changes and modifications may be made without departing from the spirit and scope of the invention as defined in the following claims.

The invention claimed is:

1. A ship comprising:
   a liquefied natural gas (LNG) storage tank containing LNG;
   an injection engine designed to use only fuel oil for a first power operation and further configured to use both LNG and fuel oil for a second power operation; wherein the injection engine is configured to consume less power in the first power operation than in the second power operation;
   a generator designed to use LNG to generate electricity;
   a motor operable using the electricity generated from the generator;
   a propulsion mechanism configured to propel the ship with propelling power; and
   a clutch system configured to connect or disconnect between the injection engine and the propulsion mechanism and further configured to connect or disconnect between the motor and the propulsion mechanism, which enables the ship to operate in a first mode of propelling power and a second mode of propelling power,
   wherein when the ship is operating in the first mode of propelling power that is below a reference level, the clutch system is configured to connect the motor to the propulsion mechanism and disconnect the injection engine from the propulsion mechanism, whereby the propelling power comes only from the motor such that the propelling power is generated by the use of LNG only,
   wherein when the ship is operating in the second mode of propelling power that is above the reference level, the clutch is configured to connect the injection engine to the propulsion mechanism and disconnect the motor from the propulsion mechanism, whereby the propelling power comes from the injection engine such that the propelling a power is generated by the use both LNG and fuel oil.

2. The ship according to claim 1,
wherein the storage tank contains boil-off gas (BOG) of the LNG therein, and the ship is configured to supply the BOG discharged from the storage tank to the generator.

3. The ship according to claim 1, wherein the reference level is equal to or less than 40% of the maximum power of the injection engine.

4. The ship according to claim 1, wherein the pressure of the LNG supplied to the injection engine ranges from 150 to 600 bar.

5. The ship according to claim 1 wherein the generator comprises a dual fuel(DF) engine, a gas engine, or a gas turbine.

6. The ship according to claim 1, wherein the motor comprises a motor/generator, and a part of the power from the injection engine is transmitted to the motor/generator through the clutch system in order to generate electricity.

7. The ship according to claim 6, wherein the electricity generated by the motor/generator is supplied to a variety of electricity consumers of the ship through a distributing board.

8. The ship according to claim 2, wherein the pressure of the LNG supplied to the injection engine ranges from 150 to 600 bar.

9. The ship according to claim 3, wherein the pressure of the LNG supplied to the injection engine ranges from 150 to 600 bar.

10. The ship according to claim 2, wherein the generator comprises a dual fuel(DF) engine, a gas engine, or a gas turbine.

11. The ship according to claim 3, wherein the generator comprises a dual fuel(DF) engine, a gas engine, or a gas turbine.

* * * * *